US011221279B2

(12) United States Patent
Sur

(10) Patent No.: US 11,221,279 B2
(45) Date of Patent: Jan. 11, 2022

(54) LASER-BASED IN-SITU EXHAUST GAS SENSOR

(71) Applicant: Indrio Technologies, Inc, San Jose, CA (US)

(72) Inventor: Ritobrata Sur, East Palo Alto, CA (US)

(73) Assignee: Indrio Technologies, Inc, San Jose, CA (US)

( * ) Notice: Subject to any disclaimer, the term of this patent is extended or adjusted under 35 U.S.C. 154(b) by 0 days.

(21) Appl. No.: 16/740,431

(22) Filed: Jan. 11, 2020

(65) Prior Publication Data

US 2020/0225126 A1 Jul. 16, 2020

Related U.S. Application Data

(60) Provisional application No. 62/792,986, filed on Jan. 16, 2019.

(51) Int. Cl.
*G01N 21/25* (2006.01)
*G01N 1/22* (2006.01)

(52) U.S. Cl.
CPC ......... *G01N 1/2252* (2013.01); *G01N 1/2205* (2013.01); *G01N 21/255* (2013.01); *G01N 2201/0636* (2013.01); *G01N 2201/06113* (2013.01)

(58) Field of Classification Search
CPC .. G01N 1/2252; G01N 1/2205; G01N 21/255; G01N 2201/06113; G01N 2201/0636; G01N 21/35; G01N 21/26; G01N 21/34
USPC ................... 356/432–444, 233–236
See application file for complete search history.

(56) References Cited

U.S. PATENT DOCUMENTS

| 5,818,578 | A | * | 10/1998 | Inman | ................ G01N 21/3504 356/246 |
| 5,993,915 | A | * | 11/1999 | Krebsbach | .............. C23C 4/067 427/452 |
| 6,809,825 | B2 | | 10/2004 | Kaufmann | |
| 8,155,890 | B2 | | 4/2012 | Goto | |
| 9,250,175 | B1 | * | 2/2016 | McManus | ............ G01N 21/031 |

(Continued)

FOREIGN PATENT DOCUMENTS

| WO | WO1997049979 | 12/1997 |
| WO | WO2010060686 | 6/2010 |

OTHER PUBLICATIONS

Cost-Effective Manufacturing of Compact TDLAS Sensors for Hazardous Area Applications.

(Continued)

*Primary Examiner* — Isiaka O Akanbi
(74) *Attorney, Agent, or Firm* — Lumen Patent Firm

(57) ABSTRACT

A laser absorption spectroscopy exhaust gas sensor includes an optical cell with porous walls having pores with a mean diameter in the range of 0.1 nm to 1 mm; gold mirrors within the optical cell positioned to support a multi-pass optical path within the optical cell; an active heating element adapted to heat the optical cell to prevent condensation; a laser adapted to generate a laser beam; an optical detector adapted to detect a returning laser beam; and a processor for controlling the laser and the active heating element and for analyzing signals from the optical detector to identify a gas in the optical cell.

21 Claims, 14 Drawing Sheets

(56) References Cited

U.S. PATENT DOCUMENTS

| | | | | |
|---|---|---|---|---|
| 2006/0162425 A1* | 7/2006 | Lange | ............... | G01N 33/0009 |
| | | | | 73/31.05 |
| 2007/0081162 A1* | 4/2007 | Roller | ............... | G01N 21/3504 |
| | | | | 356/437 |
| 2012/0077688 A1* | 3/2012 | Bergo | ............... | G01N 33/5308 |
| | | | | 506/9 |
| 2012/0242989 A1* | 9/2012 | So | ........................ | G02B 5/10 |
| | | | | 356/402 |
| 2014/0204382 A1* | 7/2014 | Christensen | ......... | G01N 21/031 |
| | | | | 356/402 |
| 2015/0247788 A1* | 9/2015 | Paul | .................. | G01N 21/3504 |
| | | | | 356/338 |
| 2016/0069797 A1* | 3/2016 | Chanda | ................ | G01N 21/31 |
| | | | | 356/437 |
| 2017/0052174 A1* | 2/2017 | Branch | ............... | G01N 29/022 |

OTHER PUBLICATIONS

High-temperature multipass cell for infrared spectroscopy of heated gases and vapors, Review of Scientific Instruments 78, 013110 2007.

\* cited by examiner

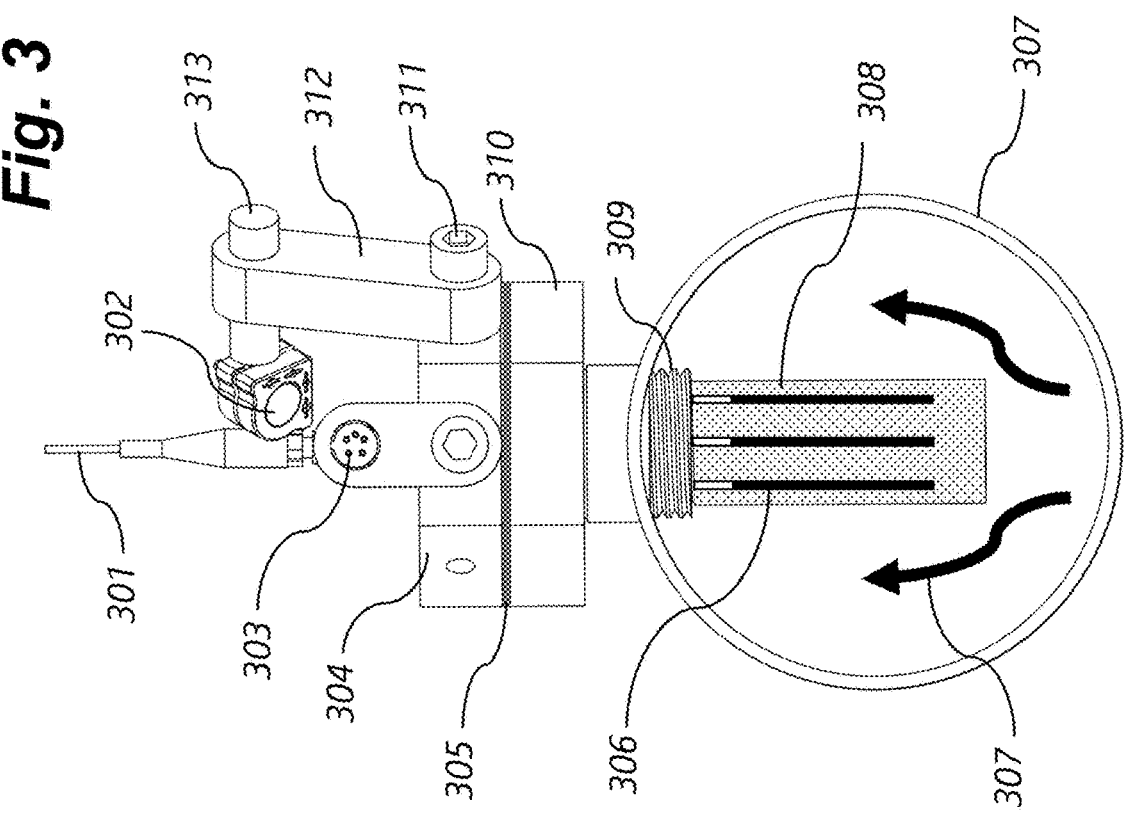
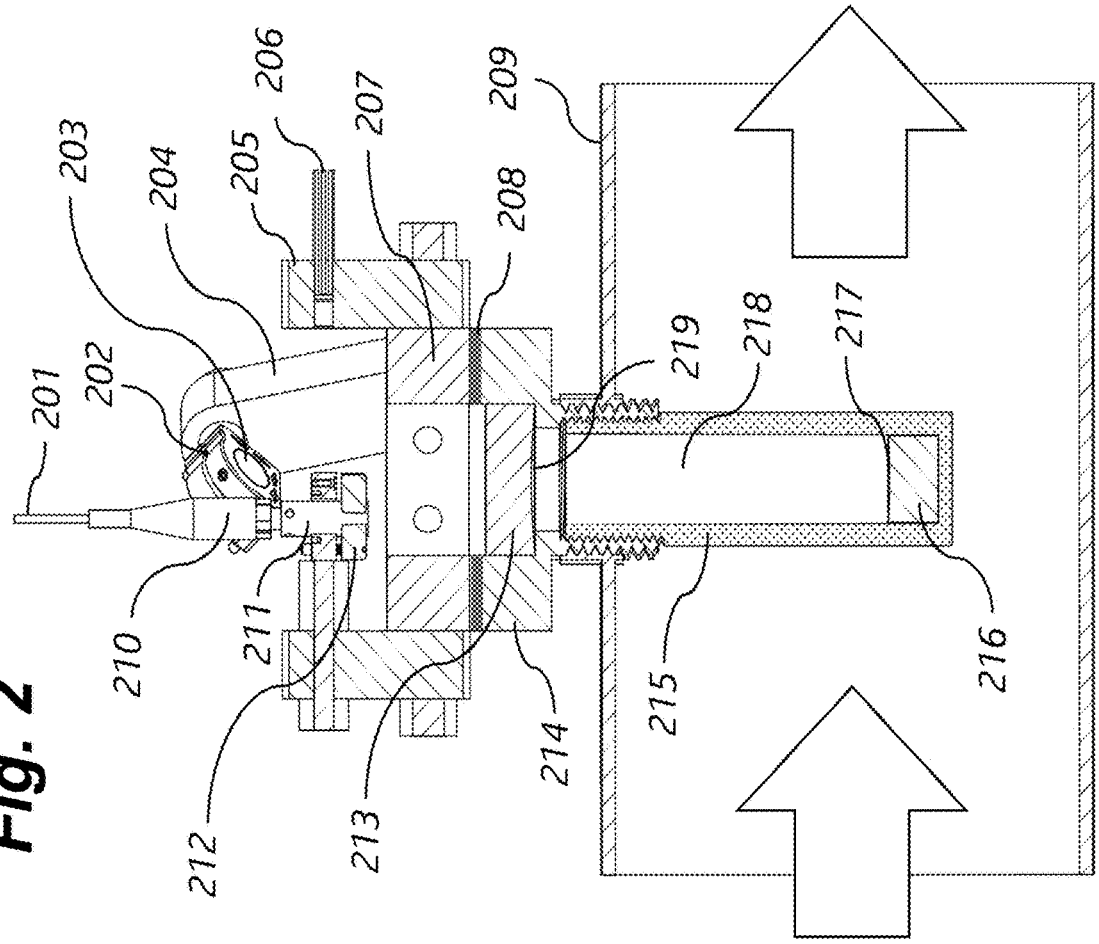

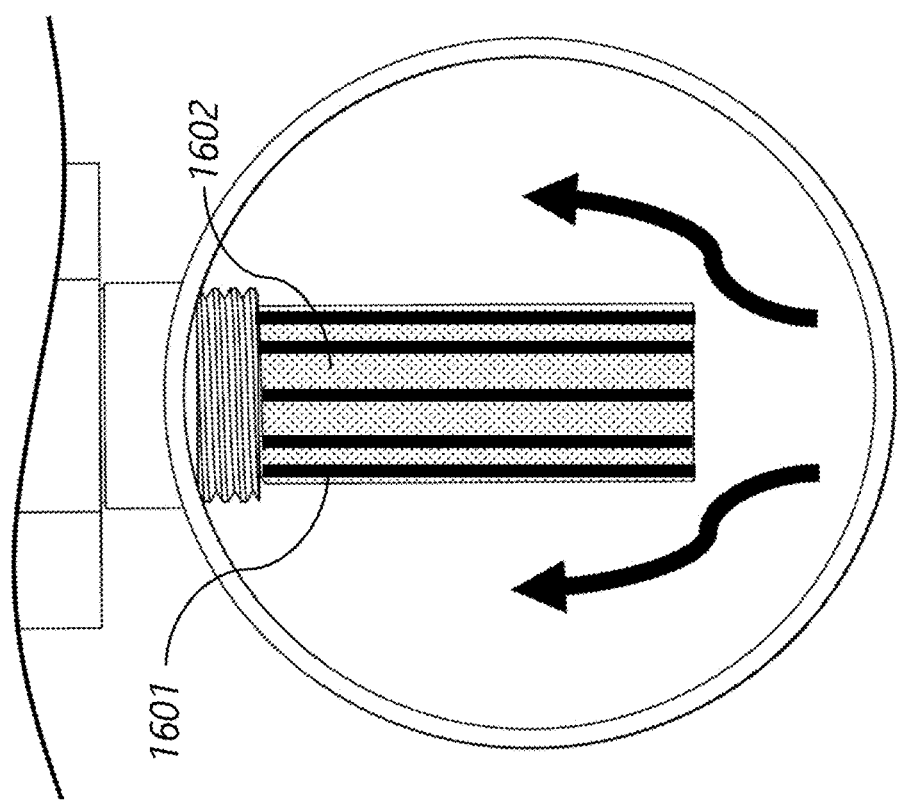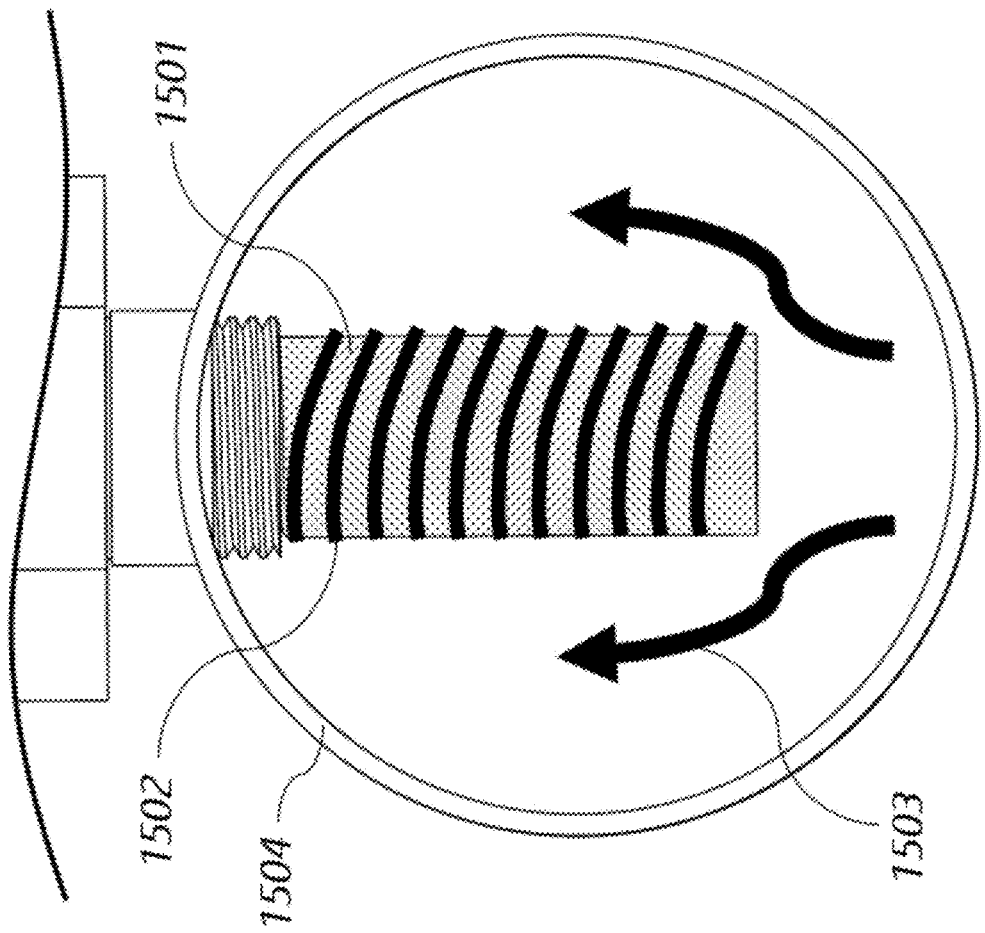

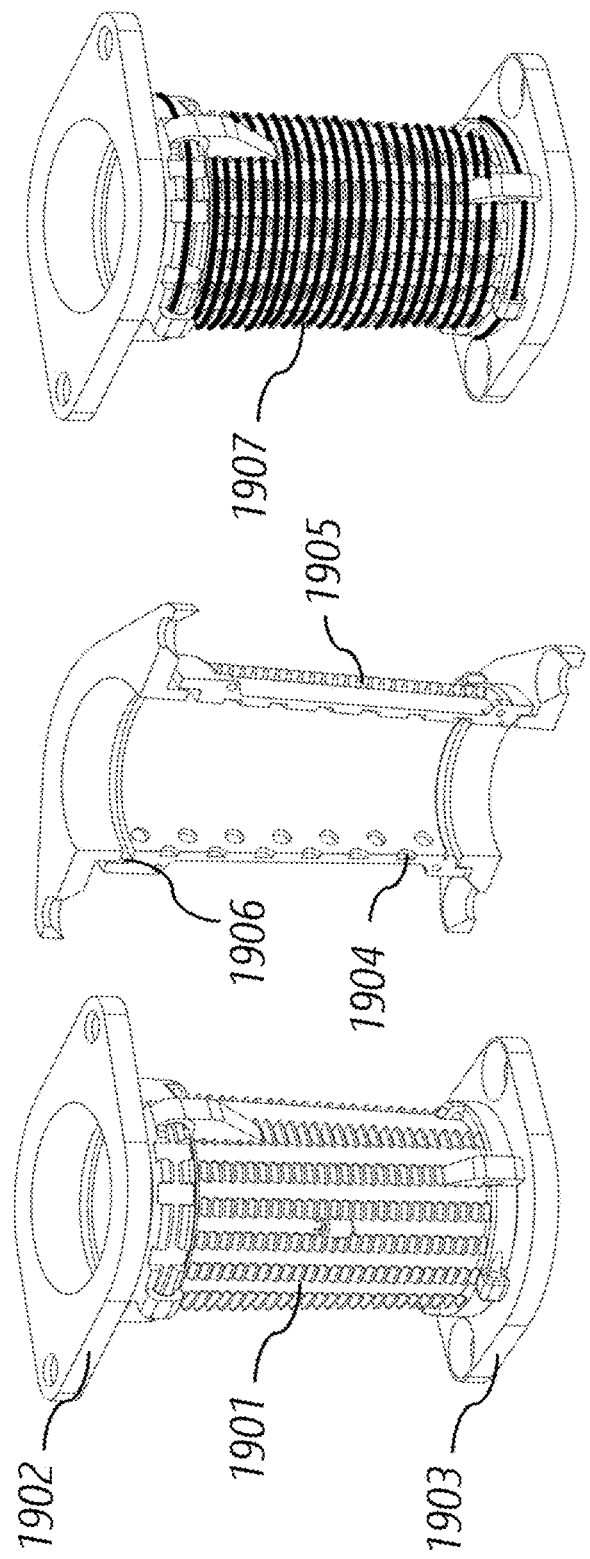

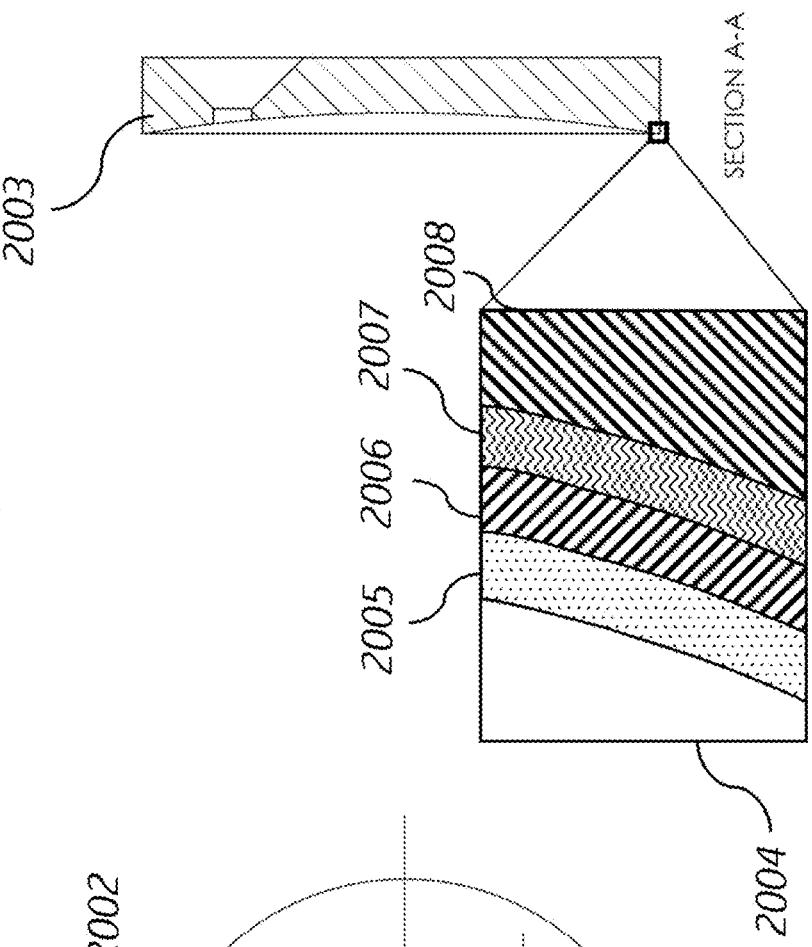
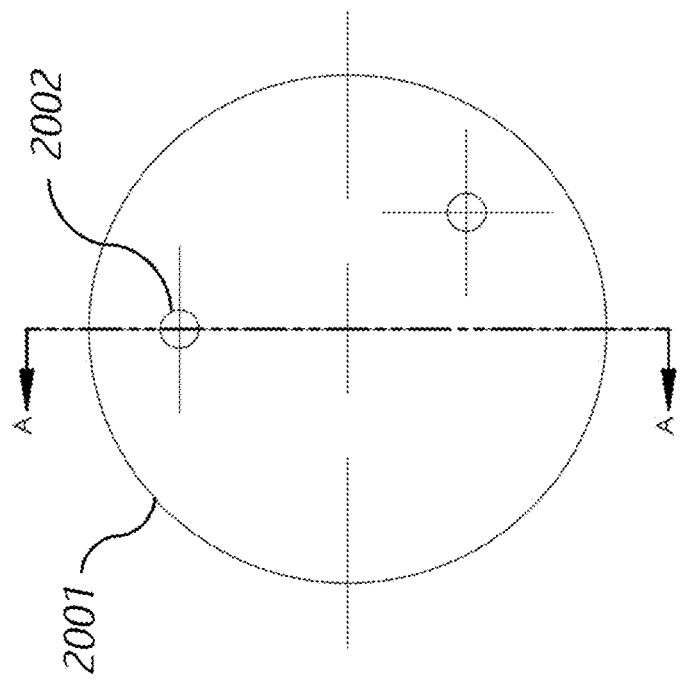
*Fig. 20A*
*Fig. 20B*

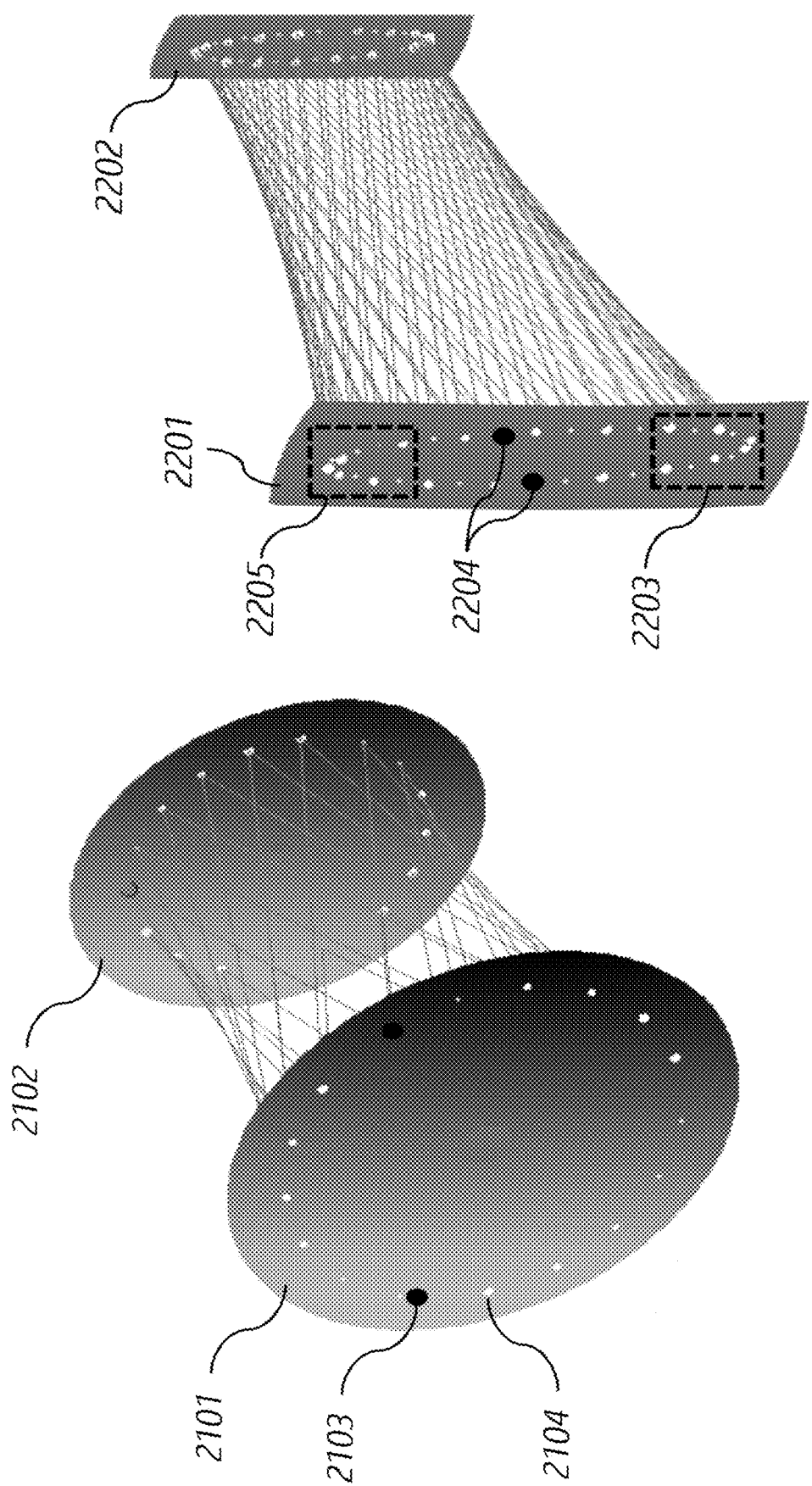

LASER-BASED IN-SITU EXHAUST GAS SENSOR

CROSS-REFERENCE TO RELATED APPLICATIONS

This application claims priority from U.S. Provisional Patent Application 62/792,986 filed Jan. 16, 2019, which is incorporated herein by reference.

FIELD OF THE INVENTION

The present invention relates generally to methods and devices for detecting the concentration of gases. More specifically, it relates to techniques for the in-situ detection of low concentration components using laser absorption spectroscopy at elevated temperatures in presence of particulates and moisture such as vehicle exhaust and power plants.

BACKGROUND OF THE INVENTION

Laser-based sensing technologies have been widely used for applications ranging from environmental monitoring to healthcare. In these sensors, an optical cell is filled with the analyzed gas mixture, and the laser enters the cell through a window of the cell and exits the cell through a different or the same window after having traveled a distance through the analyzed gas within the cell. Sometimes, to increase the sensitivity of the sensor, the distance traversed through the mixture is increased through the use of one or multiple mirrors. Most of these highly explored areas are in clean environments without running the risk of laser beam blockage by particles or condensation. However, one of the important advantages of laser-based technologies is the ability to monitor gases in high-temperature and hostile environments, for example for measuring combustion product concentration. However, one of the problems of existing devices is the issue of keeping the optical cells clean throughout the operating lifetime of these devices. Over a long period of exposure in these environments, the particles and moisture deposit on and/or corrode the optically reflective or transparent surfaces, leading to a failure of these instruments.

SUMMARY OF THE INVENTION

In one aspect, the invention provides a gas sensor comprising an actively heated cell with walls porous to gases, but at the same time preventing most particles from entering the cell, thereby keeping it clean. The porous wall design utilizes a knowledge of local particle distribution. Too small pore size unfavorably restricts the diffusion/flow rates of the sample. In this regard, the pore size is chosen to be a mean pore size defined to be equal to the size of a smallest particle expected with a probability cutoff in flow. For example, in the case of exhaust of a diesel vehicle, the particle distribution is divided into the following broad categories:

Coarse particles or PM10—particulates of an aerodynamic diameter 10 μm
Fine particles or PM2.5—particles with a diameter 2.5 μm
Ultrafine particles of diameters below 0.1 μm or 100 nm
Nanoparticles, characterized by diameters of less than 50 nm The nucleation mode particles start appearing more as the sample cools down and the hot particles from combustion nucleate. This process may happen mostly after the location of these sensors, if carefully placed in sites where the sample is still hot or not given enough time to nucleate (~450-800° C.). In that case, we only need to worry about the bigger particles that have escaped the diesel particle filters, placed upstream. The pore design in this specific case would be designed with respect to the particles bigger than ultrafine particles (>100 nm) and a characteristic pore size of 100 nm will be utilized. But on the contrary, if the ultrafine particles are expected in the sample, yet the smallest nanoparticles are estimated to be mostly trapped upstream or too small to impact the reflectivity of the mirrors during the lifetime of the sensor, a much finer pore size (~20 nm) may be deemed necessary. One way to achieve effective particle removal is to design the filter element with small pockets of ultrathin walls. This idea was implemented in the proof-of-concept prototype discussed later and termed the "gills" of the filter.

The actively heated cell is maintained at a temperature above the saturation temperatures of all the components to prevent condensation. A typical temperature range that can be maintained in a vehicle exhaust is between 300-600° C. This heated apparatus can also be equipped with mirrors, partially reflective or with any arbitrary number of holes in the reflective surface. The "holes" may or may not be physical holes and can merely be transparent areas in an otherwise reflective surface. Depending on the temperature distribution of the cell, the transmissive or reflective parts should incorporate all the proper materials needed to transmit or reflect the laser within tolerance at the design conditions.

Thus, in one aspect, the invention provides a laser-based in-situ exhaust gas sensor comprising: a) a laser adapted to generate a laser beam at an operational wavelength; b) an actively heated cell comprising an optical reflecting element adapted to create a beam path through cell; c) a laser beam waveguide adapted to deliver the laser beam from the laser into the actively heated cell, wherein the laser is thermally isolated from the actively heated cell; d) laser beam detector adapted to detect the laser beam after having passed through the actively heated cell, and e) signal processor adapted to identify a gas in the cell based on absorption spectroscopy; wherein the actively heated porous cell is in contact with heating elements adapted to maintain the actively heated cell at a temperature above saturation temperatures of components in an exhaust stream in order to prevent their condensation; wherein the actively heated porous cell has walls with pores having a mean diameter sufficiently large to allow desired particles for sensing to pass through the pores and sufficiently small to block undesired contaminate particles from passing through the pores, whereby undesired effects of contaminants on laser sensing in the interior of the cell are mitigated.

In some embodiments, the cell has multiple-pass laser beam pattern form as a result of multiple reflections between multiple mirrors at the conditions of the cell. The reflectivity of mirror surface is chosen to reflect laser beams with attenuation lower than what is needed to detect the output beam intensity at the laser detector with SNR>100. In some embodiments, a protective top layer of silica and $Al_2O_3$ can be applied on a gold or other metallic mirror surface.

In one aspect, the invention provides a laser absorption spectroscopy exhaust gas sensor comprising: an optical cell with porous walls having pores with a mean diameter in the range of 0.1 nm to 1 mm; gold mirrors within the optical cell positioned to support a multi-pass optical path within the optical cell; an active heating element adapted to heat the optical cell to prevent condensation; a laser adapted to generate a laser beam; an optical detector adapted to detect a returning laser beam; and a processor that is isolated from the optical cell by a flexible conduit for controlling the laser and the active heating element and for analyzing signals from the optical detector to identify a gas in the optical cell.

The laser absorption spectroscopy exhaust gas sensor may also include an optical waveguide adapted to carry the laser beam from the laser to the optical cell and to carry the returning laser beam from the optical cell to the detector, and adapted to thermally isolate the laser from the optical cell.

Preferably, the porous walls are composed of porous sintered metal powder, wire mesh, or ceramic. Preferably, the porous walls have pores with a mean diameter sufficiently large to allow a desired gas for sensing to pass through the pores and sufficiently small to block undesired contaminate particles from passing through the pores. Preferably, the pores have a mean diameter in the range of 10 nm to 10 microns.

The laser absorption spectroscopy exhaust gas sensor may include a protective top layer on the gold mirrors.

The active heating element may be integrated within the porous walls or attached to the porous walls. Preferably, the active heating element is adapted to heat the optical cell to a temperature above a saturation temperature of components in an exhaust gas in order to prevent condensation.

Preferably, the walls of the optical cell have non-porous sections.

The gold mirrors may be composed of unprotected gold deposited on a substrate.

The gold mirrors may comprise concave mirrors.

The gold mirrors may comprise opposing spherical mirrors whose focal lengths differ.

The porous walls may have multiple sections with differing wall thicknesses adapted to enhance a flow of gas into the optical cell.

The multi-pass optical path preferably has a length greater than 50 cm with physical length less than 5 cm.

The multi-pass optical path preferably has a partially overlapped beam spot pattern on mirrors with an elliptical shape on mirrors away from the inlet and outlet holes.

The sensor may further comprise a fastening thread positioned around the optical cell and adapted to secure the sensor to a vehicle exhaust pipe.

BRIEF DESCRIPTION OF THE DRAWINGS

FIG. 2: Section view of the hot section of a sensor variant.

FIG. 3: Axial view of the hot section of the sensor variant shown in FIG. 2.

FIG. 15: Porous optical cell with spiral heating element.

FIG. 16: Porous optical cell with straight heating element.

FIGS. 19A, 19B, 19C: Views of the porous wall implemented in the first-generation prototype.

FIGS. 20A, 20B: Inlet mirror and detailed views of the coating layers on substrate.

FIG. 21: Unequal focal-length multipass cell arrangement showing tapered spot pattern.

FIG. 22: Partially overlapped spot pattern obtained for ultra-compact multipass cell configuration.

DETAILED DESCRIPTION

Figure 1:
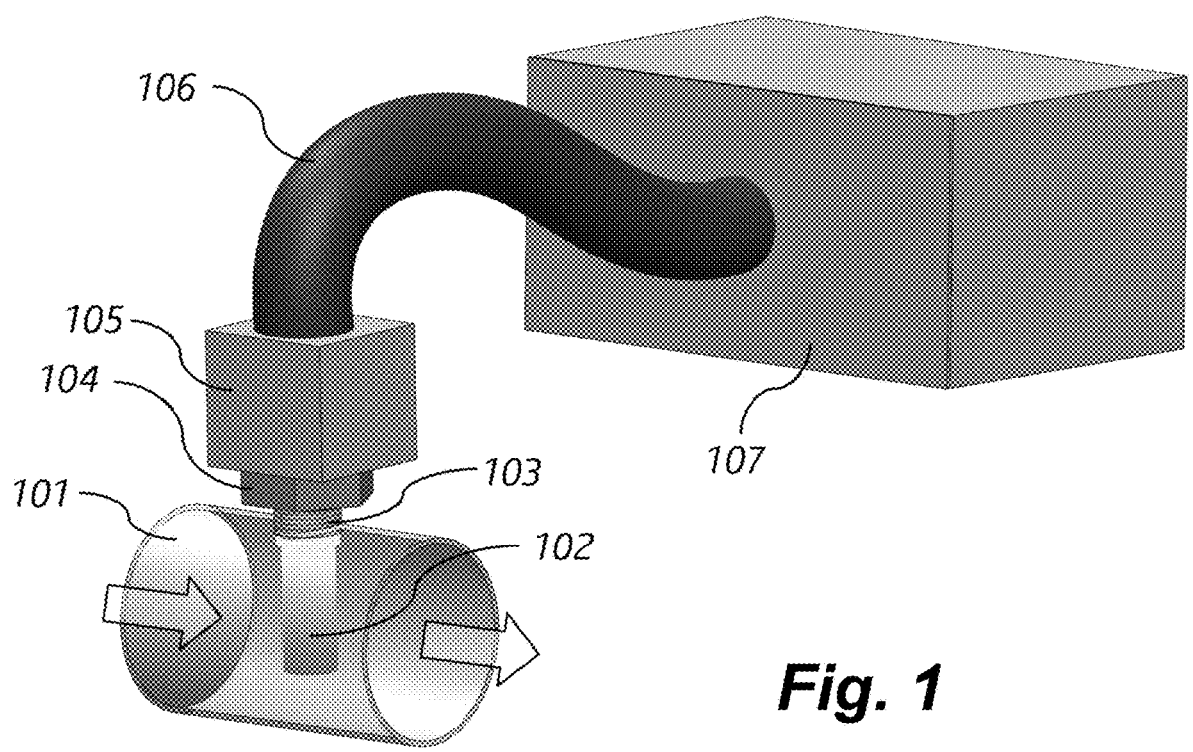
FIG. 1: Overview of the Laser-based in-situ exhaust gas sensor architecture.

One of the first explored applications of this sensor design is vehicle exhaust monitoring. FIG. 1 depicts this use case. For example, the section of pipe 101 in FIG. 1 represents any pipe carrying gases. But specifically, in the case of vehicle exhaust, it can represent a section of the tailpipe. The arrows exemplify the direction of gas flow through this section. The high-temperature porous optical cell (POC) 102 is the central element of this invention with porous walls. The pore diameter can be selected based on the knowledge of the average particle distribution in that environment. Mean pore size can be equal to or a fraction of the smallest particle in flow below a design threshold in the probability in the particle size vs probability distribution function. Typical dimensions of acceptable pores in automobile exhaust pipe are 10 nm-10 microns. More generally, the mean pore size could be selected to be a diameter within the range from the molecular sieve (~0.1 nm) up to the size of a simple wire mesh~1 mm.

This surface, although shown as a cylindrical element in this figure, can be of any arbitrary shape including other cylindrical and prismatic shapes. The fastening section 103 is used to mount the optical cell inside the pipe 101. Although 103 is shown here as a threaded junction, it can be any other gas-leak-proof junction, including flanged seals (as is the case for the first prototype) or threads. In the illustrated example, the typical design of an Oxygen/NOx sensor mount is used to enable easy aftermarket replacement. The head of the sensor 104 is named the endcap of the sensor and is present outside the confines of the pipe 101. This can be used to tighten the gas seal with the exhaust pipe and also provide space to thermally isolate the high temperature optics (HTO) chamber 105 (thus named because it houses high temperature optics to launch laser and receive it back after it has exited the optical cell 102 containing the sample gas). The temperature at the HTO chamber is a strong function of the heat transfer from the exhaust pipe 101. In our first prototype, the maximum measured temperatures in the HTO chamber was always below 150° C. The conduit 106 (flexible or rigid) is used to transport and protect the fiber-optics and the wires that communicate light, voltage, current or data to and from the sensor electronics box 107, which may house the parts of the sensor that need to be or can be isolated from the high-temperature regions of the assembly. Few important components of the electronics box 107 may include a) laser, b) laser control hardware, c) photodiode, d) analog to digital or digital to analog converters, and/or e) the processing computer with communications units. A few of the most commonly used modes of operation of the laser control box is described next. The laser temperature controller unit can maintain a fixed temperature setting of the tunable laser diode or chip or array via a thermoelectric cooler (TEC) inside the laser housing. Additional external cooling (e.g. water or fin-based passive cooling) may be required to maintain the target laser temperature. The laser current controller is used to maintain a fixed or modulate the laser current, which is a mechanism to control laser wavelength and intensity simultaneously. The current tuning is the most typical mechanism to generate the necessary patterns in laser output wavelength/frequencies and intensities. This pattern is then utilized in direct absorption, wavelength modulation, frequency modulation or other established absorption spectroscopy techniques. This method may also be used with broadband absorption techniques without the use of any mode of scanning. The output laser beam after absorption in the POC can be captured on the detector directly or via the use of a waveguide. The resulting detector voltage or current signal is then digitized by the analog-to-digital converters and then subsequently interpreted in the embedded computer. Another version may use fully analog signal generation and analog lock-in-filters to obtain the final data that can be used with usual absorption spectroscopy techniques. With some modifications, photoacoustic spectroscopy may also be utilized with the current setup along with necessary modifications in the architecture (e.g. use of microphones and tuning forks in the POC), given the surrounding environment is relatively noise-free and the temperature rating of the components.

Figure 4:
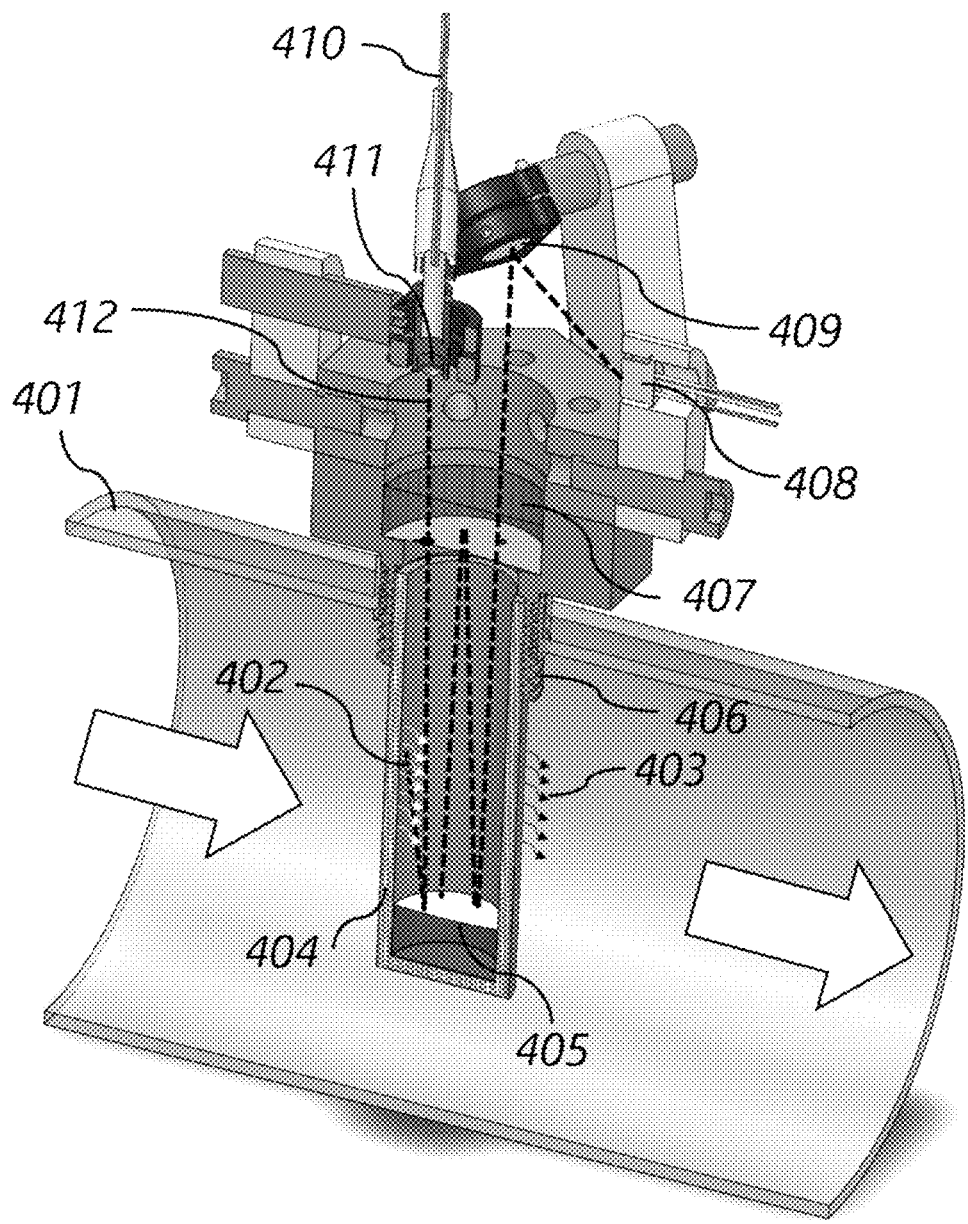
FIG. 4: 3D section view of the hot section of the sensor variant shown in FIG. 2.
Figure 6:
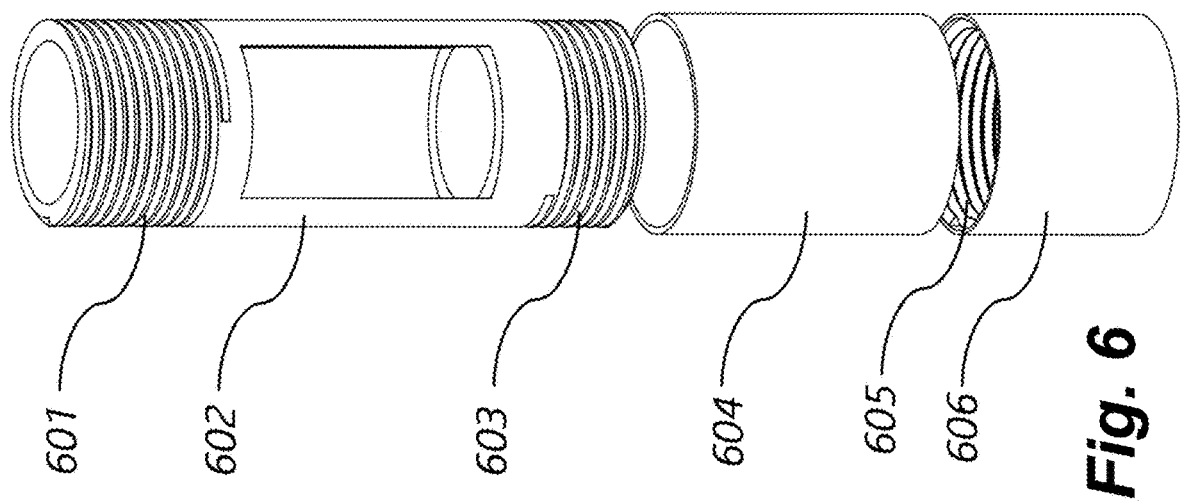
FIG. 6: Exploded view of the hot section of the porous sleeve variant.
Figure 5:
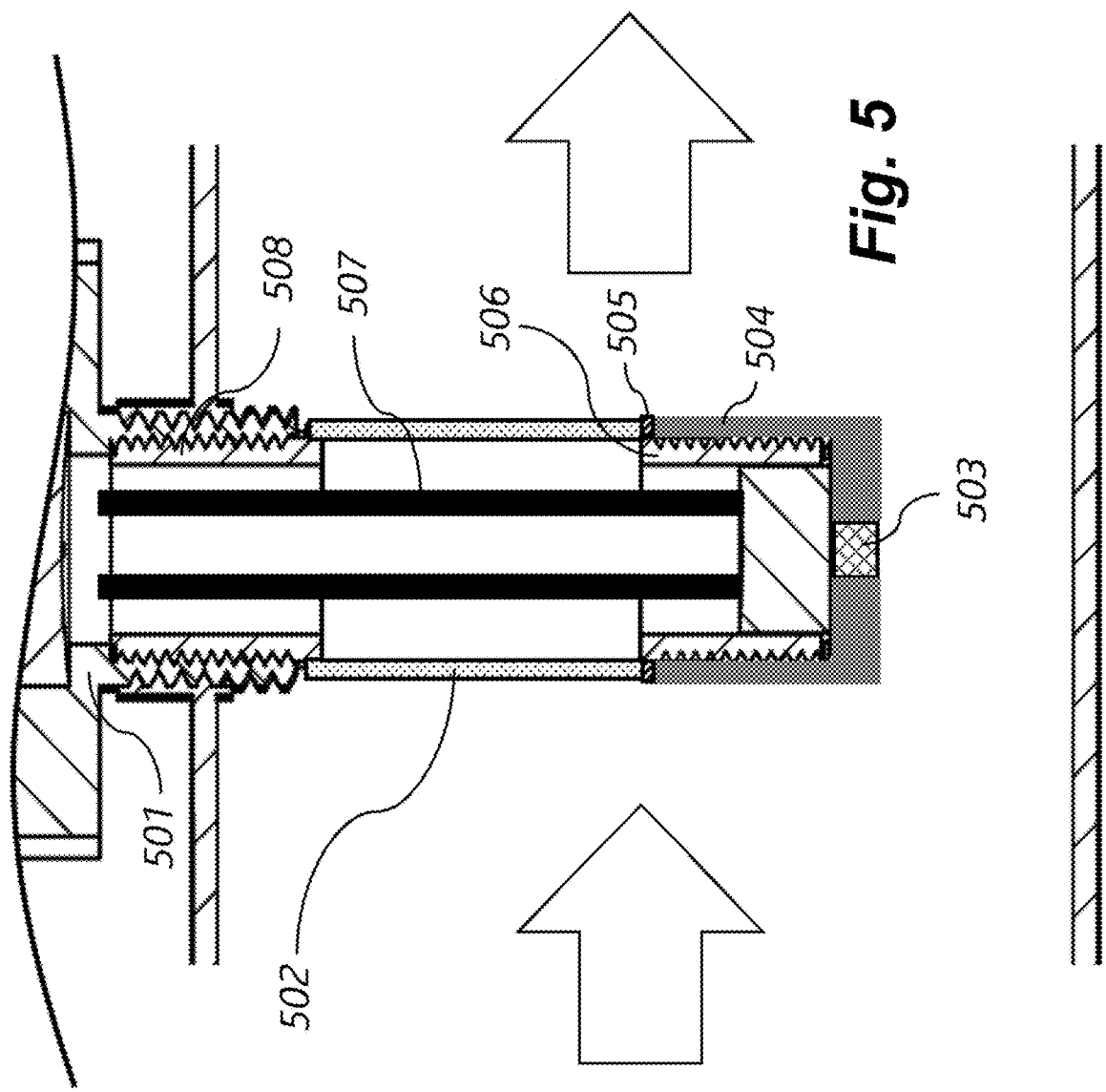
FIG. 5: Section view of the hot section of the porous sleeve variant.
Figure 8:
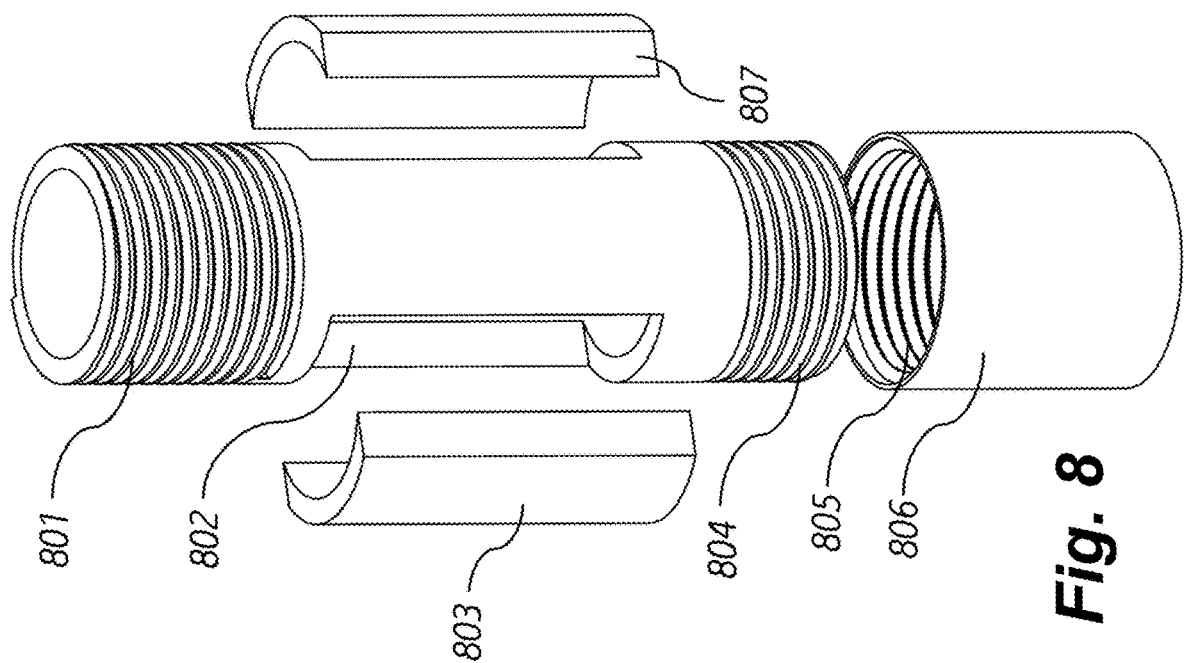
FIG. 8: Exploded view of the hot section of the porous window variant.
Figure 7:
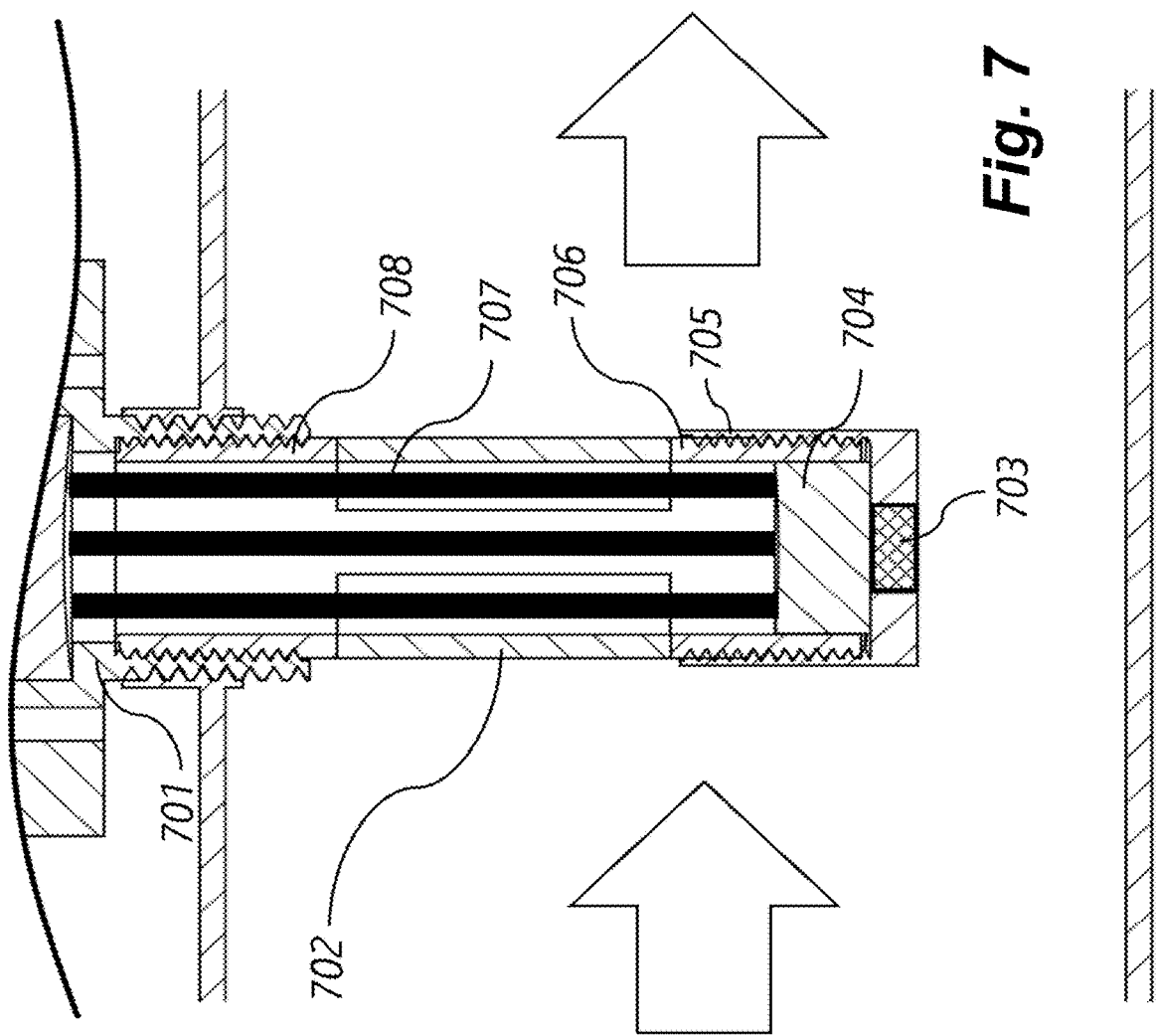
FIG. 7: Section view of the hot section of the porous window variant.
Figure 10:
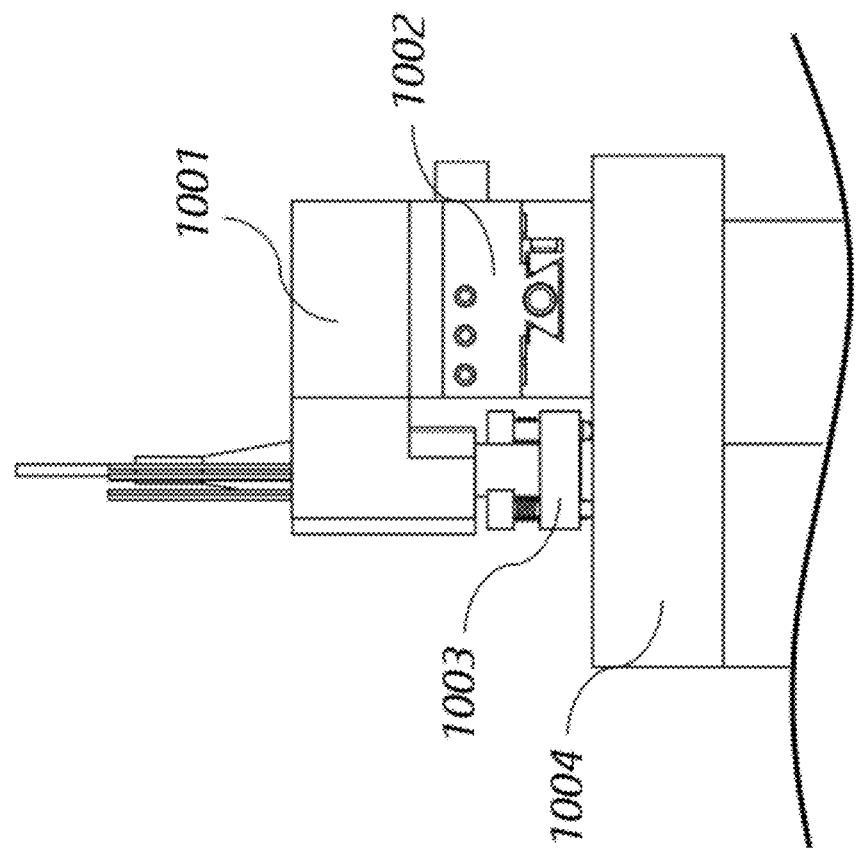
FIG. 10: Side view of simplified adjustable optical design with beam captured on detector.
Figure 9:
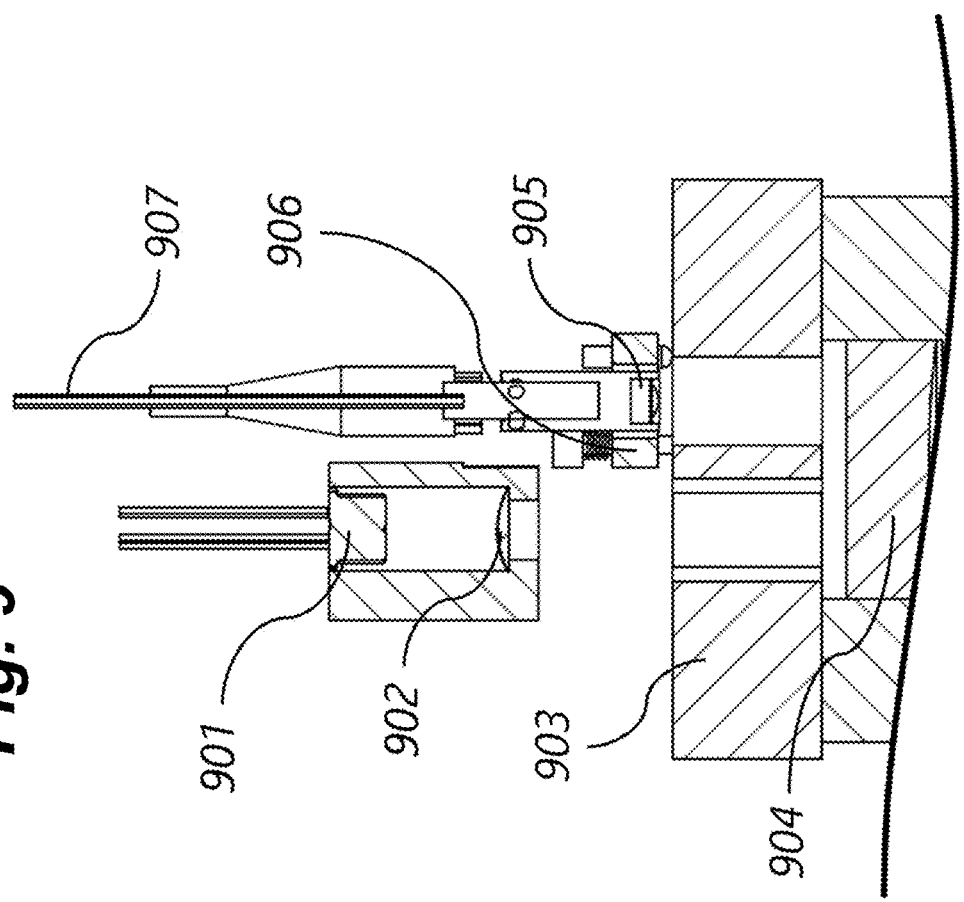
FIG. 9: Section view of simplified adjustable optical design with beam captured on detector.
Figure 12:
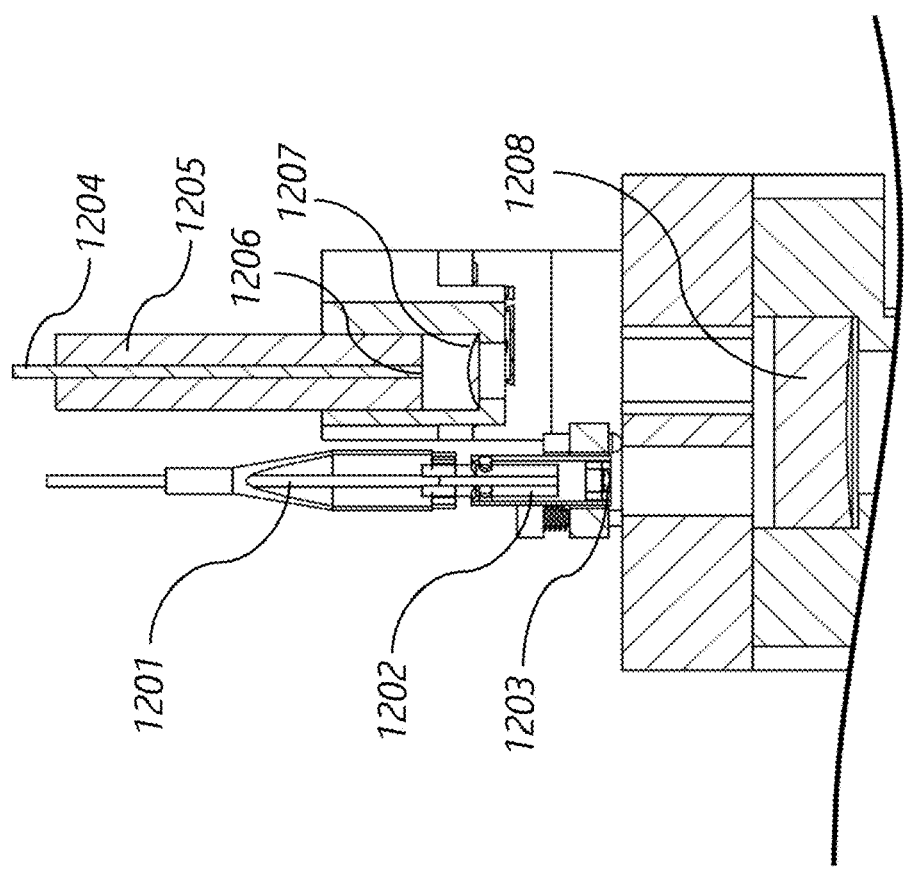
FIG. 12: Section view of simplified adjustable optical design with beam captured on fiber optic/bundle/waveguide.
Figure 11:
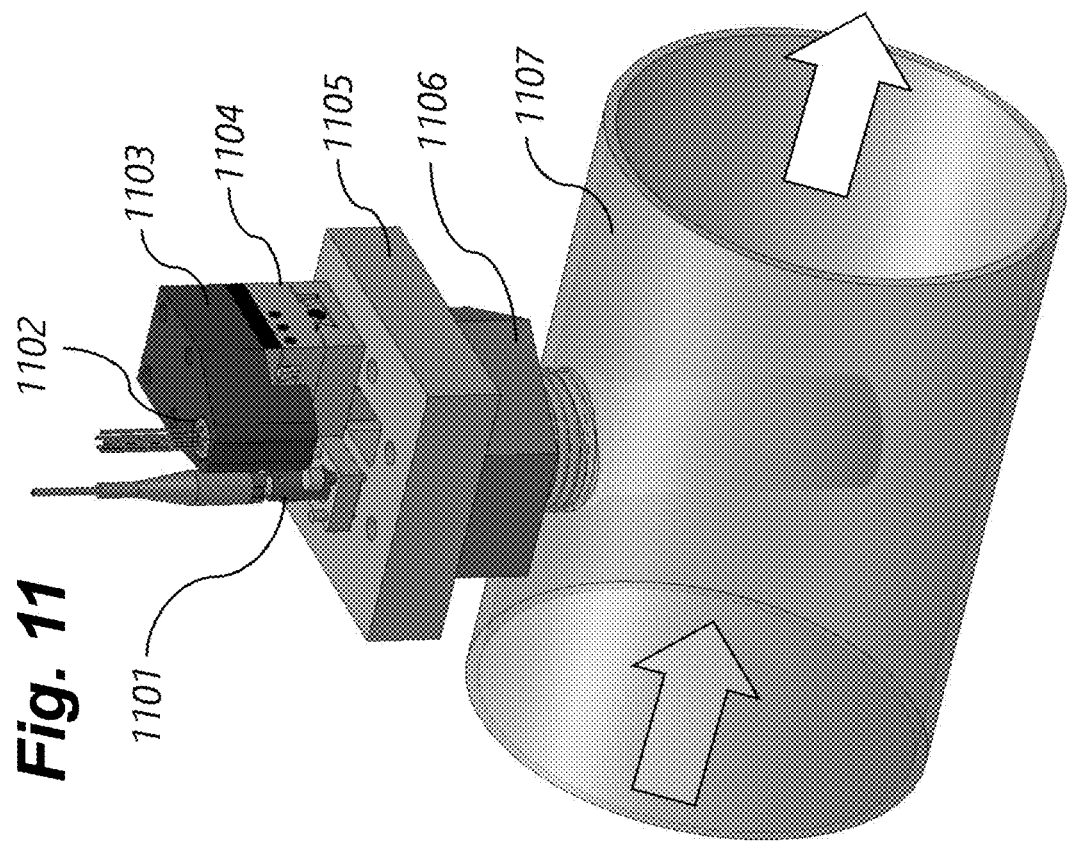
FIG. 11: 3D view of simplified adjustable optical design with beam captured on detector.

FIG. 2 (section view perpendicular to pipe axis), FIG. 3 (view along the axis) and FIG. 4 (3D section view) provide more detailed views of the general design architecture of the "hot section". The design elements in these figures are one of the variants of this architecture. The other variants are described in later figures. Optical fiber (201, 301 and 410) transports the laser beam from the laser housed in the electronics box 107. The optical fiber material preferably has the following properties: a) it can physically withstand the temperature it is exposed to, b) it can transmit laser wavelengths with acceptable (the "acceptability" can be achieved through various alterations in design as explained later) amount of loss at the highest design temperature distribution, and c) it can be single, multimode fibers or hollow-core waveguides. The "acceptability" of the fiber transmission boils down to the ultimate detectability of the output laser beam. There are many parameters that can influence this. For example: 1. Detection sensitivity: At near infrared wavelengths (~1.6 μm), where the detector sensitivity is very high, a very lossy fiber may be acceptable vs at 10 μm where detector sensitivities diminish, even a low-loss fiber may not be acceptable; 2. Number of reflections and multi pass mirror reflectivity: Every reflection reduces the intensity of the output beam. Therefore, the design may choose lesser number of reflections to improve output beam power and make the fiber transmission work, 3. Length of fiber: The loss/fiber length may be high, but the length of the fiber may be shortened to reduce the amount of laser intensity loss. One example of a fiber material that can withstand high temperatures (>2000° C.) and can transmit laser light with wavelengths beyond 4 μm is sapphire. Fluoride glass fibers can transmit longer wavelength ranges, but can withstand a smaller temperature range.

The laser beam is launched into the high-temperature optical cell 218 by use of fiber-collimation systems 210 and 211 and through the laser-transparent window 213, made of a material that can withstand design temperatures and moisture exposure and can transmit the wavelength of interest. For example, Calcium fluoride ($CaF_2$) windows can transmit 0.18-9.2 μm with >60% transmission and withstand>1000° C., but it starts reacting with moisture at temperatures>300° C. Therefore, careful design is need to reduce the temperature at locations where $CaF_2$ lenses and windows has to be used. Materials such as sapphire may be chosen to withstand hotter and humid environments for window 213 material, given the transmission range at the temperature range is satisfactory. Additional improvements in transmission and environmental resistance may also be achieved by applying thin film coatings on the exposed surfaces. The backside of the window 219 can be reflective polished metal or dielectric layer coated and of desired curvature with "holes", as described before. A similar construction may also incorporate a mirror and window as two individual pieces placed back to back (implemented in the first prototype). The window surface may be angled relative to the other face to reduce etaloning or fringing effects sometimes observed due to the parallelism of the window faces. The laser alignment is adjusted and secured via the fixtures and fasteners (202, 204, 205, 212 in FIG. 2, 311, 312, 313 in FIG. 3). After entering the cell, the laser beam bounces between the mirrors 213 and 216 and finally exits the cell through a hole in the mirror 213. The laser beam is then collected by the focusing mirror 203/302 onto the photodetector 206. The HTO chamber base 207/304 is thermally insulated from the sensor endcap 214/310 by a thermally insulating washer/layer 208 or 305. The thickness and material of the washer/layer 208/305 is selected to control the temperature distribution in the HTO chamber. The temperature distribution of the HTO chamber—washer/layer 208/305 is primarily a function of the conductive heat transfer rate through the washer, temperature at the endcap, other possible heat dissipation modes of the HTO chamber, and the ambient temperature. Additional passive/active heat dissipation inside and outside HTO chamber 105 can be added to enhance cooling of the HTO chamber.

The exhaust gas flows through the pipe section (209/307/401) along the direction of the arrows. The flow of gas in FIG. 3 is perpendicular to the paper except around the POC 308. POC 308 is "dipped" in the high temperature flow of the exhaust. The sensor is secured inside the pipe using the fastening thread 309/406. Please note that this thread may be the commonly used M20×1.5 thread for exhaust NOx sensors as a drop-in replacement for currently used vehicle exhaust sensors. The filtered exhaust flow seeps or diffuses into the cell 218 through the porous wall 215 or 404 as shown by small arrows 402. The flow diffuses out of the cell as illustrated by small arrows 403. The directions of these arrows are only for illustration purposes and not to be confused with actual dynamics of the flow. The construction of the porous wall 215/404 is possible through various methods including the additional methods described in the later sections. One method of construction is a cylindrical cell fabrication of porous sintered metal (e.g. austenitic nickel-chromium-based superalloys, steel etc.) powder or wire mesh with appropriate porosity. Another variant can incorporate a porous ceramic wall construction (e.g. Silica, Alumina, etc.).

The material of the cell walls is actively heated to avoid condensation using heating wires, elements or ribbons 306 and in some embodiments, it may also be temperature-controlled using embedded thermocouple(s) or other temperature monitoring devices as exemplified in FIG. 3. Whether the temperature is held constant with active temperature control is dependent on the use case. Active temperature control may be used to always match the outside sample temperature in the pipe. Sometimes, the temperature in the exhaust pipe is well above the saturation. Therefore, it needs to be only maintained above a threshold. Uncontrolled temperature could be advantageous in these situations, since it can preserve the temperature-dependent constituents, such as $NO_x$. But in this case, the temperature variations need to be measured, characterized and included in the signal interpretation models. After the tests involving the first prototype, it was concluded that at the start of operation, the temperature of the POC cell has to only exceed the saturation temperature (typically, less than 60° C.) of the exhaust gas. The sensor gets rapidly heated by the large thermal mass of the exhaust flow, removing the need to maintain certain temperatures. The operation of the sensor itself is not dependent on the temperature of the flow. This also leads to significantly lower "light-off" times in comparison to the traditional electrochemical sensors which needs to preheat to 600° C.

An example laser beam propagation path through the sensor can be illustrated by the dashed black line 412. The laser beam is launched into the free space from the fiber by the collimation optic (shown here as lens; mirrors can also be used) 411. The laser beam then enters the POC through the window 407 and "holes" in the mirror or through the partially transmissive mirror surface. Upon entering the cell, it starts reflecting back and forth between input/output mirror 217 and back-reflecting mirror surface 219 or 405. The pattern formed by multiple reflections between these surfaces dictate the optical path length of absorption. Example laser multipass patterns are Herriott or White multipass architecture, widely used in practice in laser sensing. Any other alternative patterns can also be implemented by using, for example, astigmatic or spherical mirrors. The beam may exit from the same or different hole in the input/output mirror 217. The output beam can be collected on the photodiode (303 or 408) by various methods that may or may not involve lenses, mirrors, fiber-optics, fiber-optic bundle, waveguide or a combination thereof as described next or in the subsequent sections. This multipass arrangement is used to obtain greater than 50 cm optical path length within a physical length of 5 cm. The beam can be reflected by the use of a concave or flat mirror 409 on the photodiode 408 surface. The photodiode converts the incident beam into a current or voltage which is then transmitted to the amplifier and then to the analog to digital converter. The received signal is then analyzed to obtain information on concentration and/or temperature of the mixture as is commonly practiced in laser-absorption spectroscopy by methods such as direct absorption or wavelength modulation spectroscopy (WMS).

Although the above embodiments have been described for purposes of illustration using optical wavelengths for the laser beam, the principles of the invention generalize to wavelengths outside the optical range, from microwave through x-ray. In general, the upper limit of the beam size can be limited to the max physical dimensions of POC diameter. Example of the beam diameters are in the range of 0.1 micron to 10 cm. The window and mirror materials and the method of beam launch (fiber/non-fiber) may need to be modified appropriately based on the wavelength used. In general, at any wavelength the core spectroscopy technique used is absorption spectroscopy. However, the exact scheme of measurement depends on the tuning mechanism, if tuning is possible or even needed. For example, wavelength modulation spectroscopy can be used only for current tunable lasers. Direct absorption can be used for non-tunable and tunable lasers, broadband and narrow-band lasers, it does come with a set of disadvantages.

The sensor can be manufactured by implementing a combination of the following alternative designs for the various parts of the previously discussed designs:

A. Alternative Designs for Porous Wall Construction

Construction of the POC 102 as a single-element may impact its manufacturability and quality assurance. The POC is connected to the sensor endcap 501/701 as shown. A couple of alternative approaches are shown in FIGS. 5, 6, 7 and 8.

1. Porous Ceramic/Metal Sleeve Construction (FIGS. 5 and 6):

In this design, the POC is built in 3 sections—a) rigid tubular porous or non-porous section 602, b) porous sleeve (metal or ceramic) 502/604, and bottoming cap 504/606 housing the back-reflecting mirror held in place by epoxy, high-temperature putty layer or any other high-temperature adhesive (503). These components although shown here to attach to each other by threads (508/601, 506/603 and 605), can be fastened by flanges or even high-temperature adhesives or putties. Once they are assembled (FIG. 5), a bead of high-temperature epoxy or putty or any other high-temperature adhesive can be used or a metallic sleeve may be welded to seal the junctions (505). An alternative mode of heating is also shown by 507, where a strand of heating wire/ribbon is stretches internally along the walls of 602. The term "high temperature" in this context can mean mildly hot (~200 C), Medium (Exhaust-like temperatures~500 C) or flame-like (~1500 C), depending on situations.

2. Porous ceramic/metal window construction (FIGS. 7 and 8):

Similar to the sleeve design, the POC is built in 3 sections—a) rigid tubular porous or non-porous section with multiple "window"-like openings 802 and threaded sections (706/804, 708/801, and 805) for assembly, b) two or more porous windows (metal or ceramic) 702 or 803, which can be glued or fixed via other leak-proof fastening methods to 802 (e.g. it can also be welded to the rest of the POC body.), and c) bottoming cap 705/806 that houses the back-reflecting mirror 704 attached by the glue layer 703. The heating architecture shown here (707) is similar to the one shown before, except with a little higher density than before. These porous shapes may be manufactured by 3D printing or casting followed by sintering methods to achieve the desired shape.

B. Alternative Designs for High Temperature Optics (HTO) Chamber

The launching and collection of the beam into and out of the POC can be done through some other approaches as listed below (FIGS. 9, 10, 11, 12, 13 and 14):

1. Simplified Adjustable Optical Designs (FIGS. 9, 10, 11 and 12):

A couple of variants of the previously discussed design, that allows greater compactness at the cost of reduced adjustability is shown in FIGS. 9, 10 and 11 and FIG. 12. The difference between these two variants is that the laser beam after exiting the optical cell through the hole in the mirror (904/1208) can be captured either a) directly on the detector 901 or 1102 (FIGS. 9, 10 and 11) or b) transmitted to the detector by capturing it on a fiber, fiber-optic bundle or any other waveguide 1204 first and then transmitted to the photodiode, which in that instance, shall be housed in the electronics box 107. The fiber 1204 may have a thermal insulation jacket as shown as 1205. The capturing lens (1207) focal length and distances are chosen so as to confine the majority of the captured beam shape to the numerical aperture (NA) at the collection fiber tip 1206. The common elements of this design include a) a tilt-adjustment element (906 or 1003) for the laser-fiber (907/1201) launch/collimation components (905, 1101, 1202, and 1203), b) HTO chamber baseplate 903, 1004 and 1105, c) focusing output beam capturing lens (with or without antireflective (AR) coating) 902, d) planar displacement (X-Y translation mounted) beam capture optomechanical elements (1001/1103 and 1002/1104), and e) sensor endcap 1106 mounted on pipe section 1107. This design, although shown without the insulation washer/layer 208 or 305, can be used with or without one.

Figure 14:
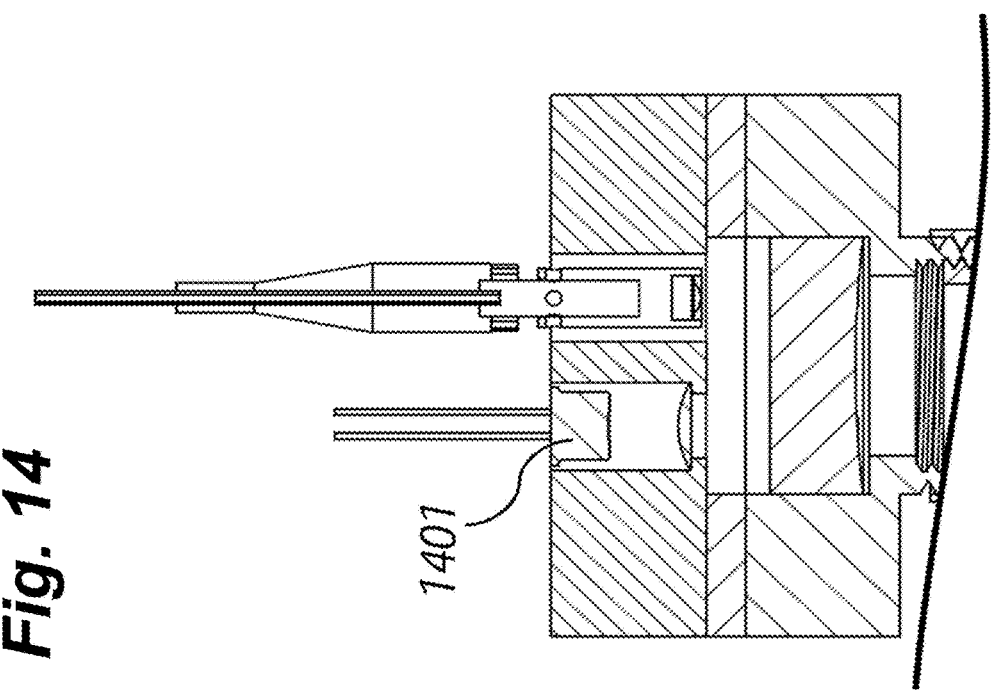
FIG. 14: Section view of simplified fixed optical designs with beam captured on detector.
Figure 13:
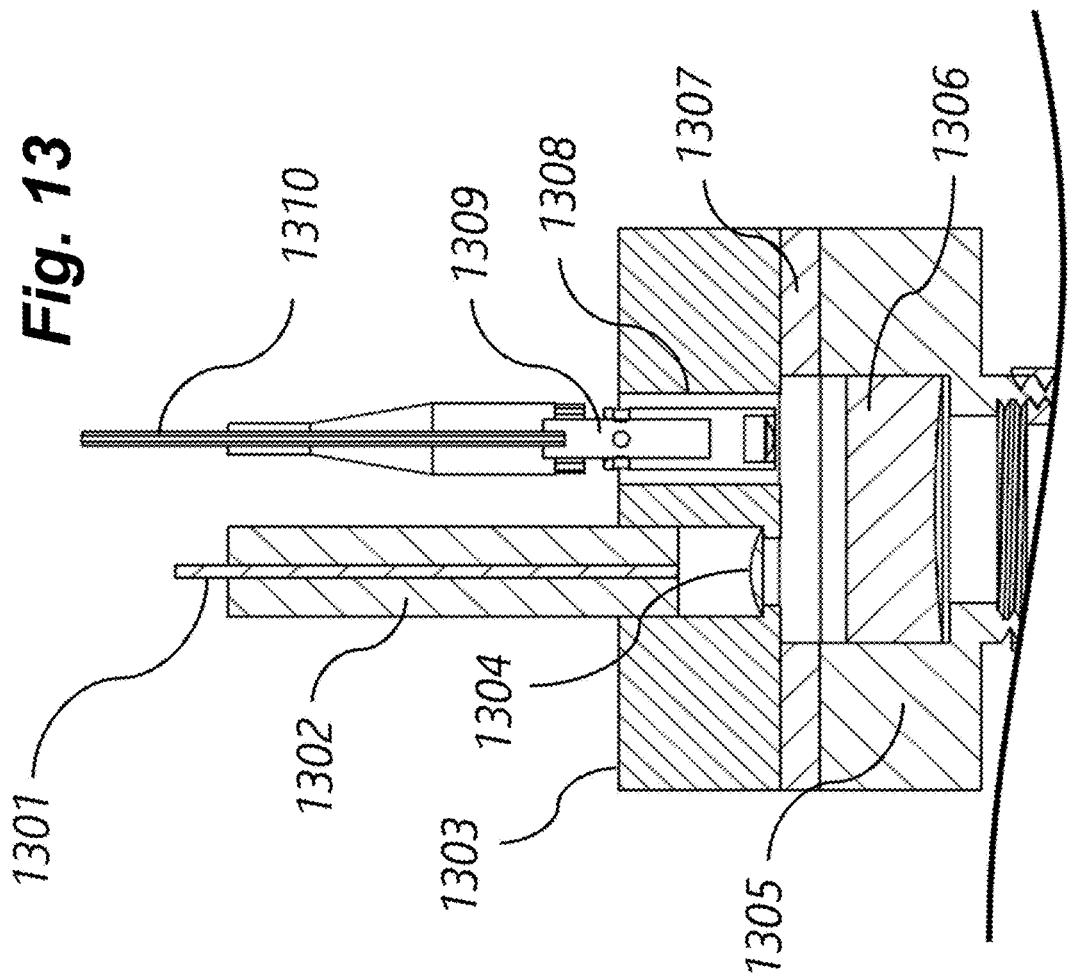
FIG. 13: Section view of simplified fixed optical designs with beam captured on fiber optic/bundle/waveguide.

2. Simplified Fixed Optical Designs (FIGS. 13 and 14):

All the previous designs are more suitable for small-scale manufacturing processes with greater flexibility in design. Once a specific design is confirmed and ready to scale, these variants remove all adjustability to improve cost performance and throughput for manufacturing. The version shown in FIG. 13 includes a) Receiving fiber, bundle or other waveguides 1301, b) Fiber protective jacket 1302, c) Beam-capture lens 1304, d) HTO chamber baseplate 1303, e) Insulation washer/layer 1307 between baseplate and endcap 1305, f) Fiber launch/collimation optics 1309, and g) Input fiber 1310. The grooves for housing the optics (e.g. 1308) in HTO chamber baseplate is mounted with precision grooves at specific angles and location in 3D space within the tolerance required by the laser beam pattern in the POC with a given hole position in the mirror 1306. FIG. 14 shows a variant where the captured light is directly captured on the detector 1401. In this approach, however, additional concerns need to be addressed regarding heat dissipation from the photodiode, either by active or passive cooling strategies. If sufficient cooling can be provided, in an alternative variant, the laser may also be directly mounted on the baseplate similar to the detector.

C. Alternative Heating Arrangements of the Porous Optical Cell (POC)

To prevent condensation of components near their saturation vapor pressures in the flow (1503) along the pipe section 1504, the temperature of the POC 1501/1602 is increased by heating as discussed before. In addition to the configurations discussed, configurations of the heating element 1502 or 1601 (e.g. ribbon, wire, etc.) in a spiral (FIG. 15) or straight (FIG. 16) patterns can be utilized. In one mode of manufacturing, the heating element may be held in the mold during the porous wall fabrication process (e.g. sintering or gel-casting processes).

Figure 17:
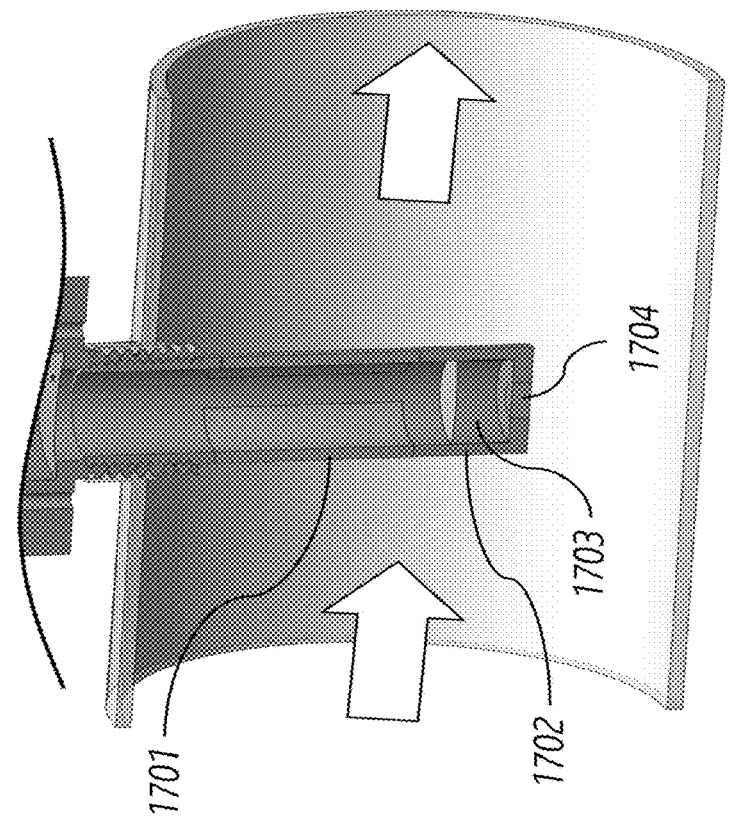
FIG. 17: A hybrid porous optical cell design concept combining the porous window and the single element construction of the cell body without the use of an endcap.

And lastly, it must be clarified that any of these sub-design elements can be combined with others to form a hybrid concept. For example, as shown in FIG. 17, the porous window design element 1701 is combined with the original single element design 1702 without the use of a bottoming cap 806. In this hybrid concept, the back-reflecting mirror 1703 is glued to the bottom of the POC through the hole with a high-temperature adhesive material 1704 (e.g. putty or ceramic adhesives).

Figure 18:
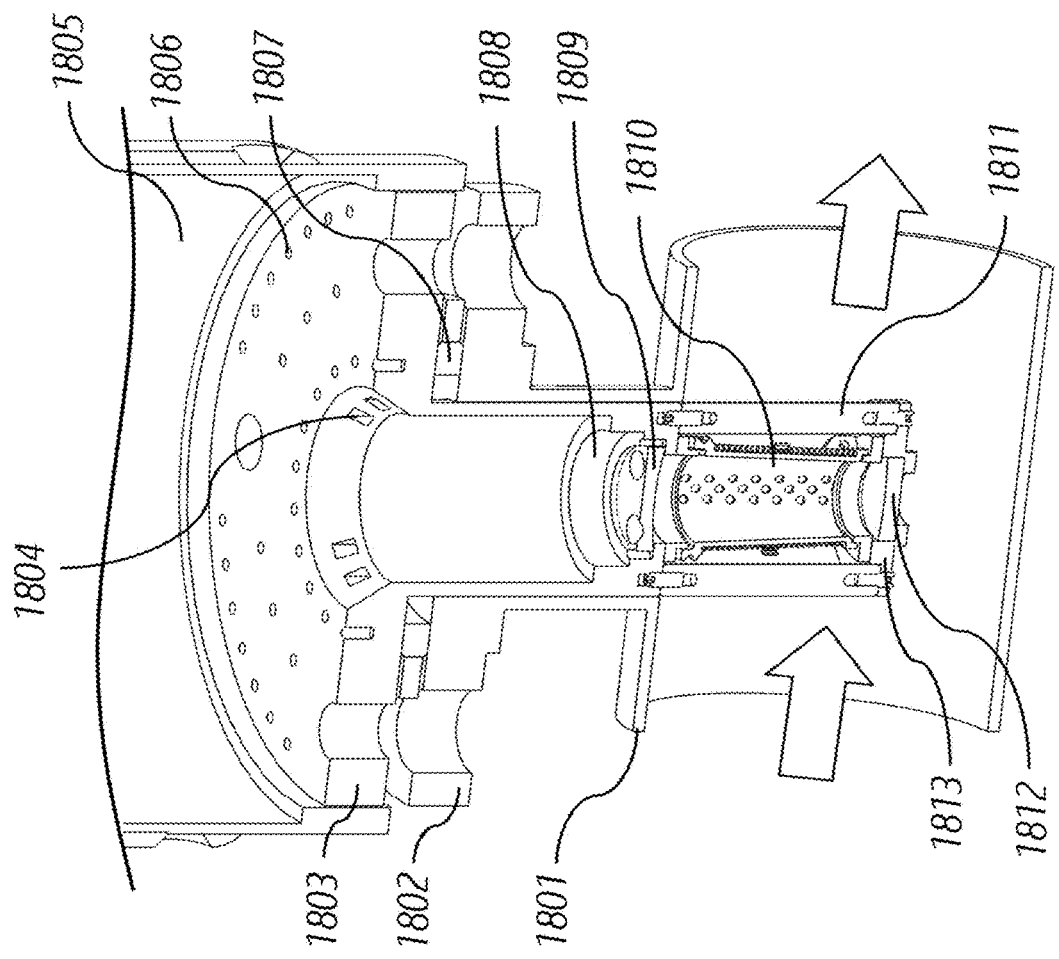
FIG. 18: Section view of first-generation exhaust sensor prototype.

This concept of in-situ exhaust gas sensor was successfully validated in the exhaust of a diesel engine. The design of the sensor is illustrated in this section using FIG. 18. This is a section view of the prototype when installed in the exhaust pipe 1801. This prototype uses a flange pair (1802 and 1803) and spiral-wound gasket 1807 to achieve gas seal between the HTO chamber 1805 and the exhaust pipe 1801. The seal between the porous optical cell (POC) 1810 and HTO chamber 1805 is achieved by a high temperature RTV or epoxy seal between the window socket 1808 and a wedged cylindrical window placed in it. The mirrors in the POC cell are denoted by 1809 (top) and 1812 (bottom). This design has an effective optical path length of 1.37 m. The top mirror 1809 is epoxied to the lowest pocket in the HTO flange 1802. The bottom mirror 1812 is epoxied to the bottom mirror cap 1813. The bottom mirror cap is fixed at a distance from the bottom face of the HTO flange by using a stainless-steel rod 1811. High-temperature wires and thermocouples are fed through the peripheral slots 1804 and sealed using a high-temperature RTV sealant. The tapped holes 1806 on the HTO flange 1802 are used to mount the high-temperature optical components.

The heated porous walls of the POC cell are a critical element of the design and is discussed separately with the aid of FIGS. 19A, 19B, 19C. This consists of three sections—the silica-based 3D-printed ceramic porous walls 1901, and stainless-steel end flanges 1902 and 1903. The porosity of the walls 1901 is controlled through the sintering temperature and time of the unfired (green) 3D printed wall. The 3D printed structure initially consists of plastic and ceramic powder. After the firing (sintering) process, the structure is made completely out of ceramic and therefore able to survive in temperatures well above the typical vehicular exhaust temperatures (600° C. max). The end flanges (1902 and 1903) can slide in and out in the groove in the ceramic wall 1906 during the installation process. The pockets on the wall 1904 termed the "gills" of the POC cell enhance the flow of surrounding gas into the cell and lead to an ultra-low residence time in the cell. The ridges on the POC wall 1905 are used to mount the wall heater nichrome or Kanthal wire as shown in 1907. These heating elements are used to pre-heat the cell above the saturation temperature (typically <60° C.) at start-up. Once the exhaust starts flowing, the exhaust gases heats up the POC cell rapidly to temperatures>150° C., leaving no room for condensation and therefore the need to actively heat the cell.

Mirror Coatings for High Temperature

A typical mirror used for the multipass cell is depicted as 2001 in FIGS. 20A, 20B. The mirrors may or may not contain holes (e.g. 2002) as is required for a desired path length by design. A section view of the mirror (section A-A) is shown by the marker 2003. An enlarged view of the layers in the mirror coating is shown by the marker 2004. The shaded regions 2005, 2006 and 2007 indicate the protective top layer, the reflective layer and the adhesive layers respectively. 2008 points to the polished substrate on which the mirror coating is applied. It was observed through experimentation that commonly used protective top layers (2005) on gold has a detrimental effect on the coating stability at high temperatures>400° C. This behavior is possibly due to uneven expansion of the layers leading to enhanced stress causing rupture of the reflective coating. Another candidate protective top layer, $HfO_2$ was found to dramatically change transparency at high temperatures. These behaviors are rather non-intuitive and a major new finding of our research. The only reflective mirror coating that survived during our high-temperature exposure tests was unprotected gold. The integrity and the thickness of the gold coating is also important in estimating its strength at higher temperatures. In addition, it was observed that the adhesion layer sandwiched between the gold coating and the substrate (fused silica in our test case), commonly a Cr, Ti or Ni layer. However, future research will be undertaken to find a suitable protective top layer that can survive at high temperatures. In addition, different substrate materials such as Stainless Steel (particularly SS 310 because of close match with thermal expansion coefficient with that of gold), Nickel alloys or Titanium could also be implemented.

Multipass Cell Design

The multipass optical cell design we have implemented is based on two new concepts: unequal focal length spherical mirrors, and partially overlapped spot arrangement.

a) Unequal focal length: The dissimilar focal length concept is illustrated through FIG. 21. Most previous mentions of Herriott-type multipass cells relied on equal focal length spherical concave mirrors or one concave and one flat mirror. Here we have generalized the concept to unequal focal length mirrors facing each other. In the figure, the inlet mirror is designated by the marker 2101. This mirror has at least two holes machined on it as shown by the black dots 2103.

The other mirror, denoted by 2102 is called the returning mirror. The spots formed on the mirror as a result of multiple reflections is shown by the white spots 2104. The smaller the marker size chosen to represent these spots, the greater is the number of reflections experienced before reaching that spot. This mirror has a longer focal length than 2101 and this leads to a relatively dense pattern on it as seen on the computer-generated ray trace. This is only advantageous as a result of our next concept.

b) Partially overlapped spot arrangement: Conventional multipass cell design dictates that the entire pattern formed on the mirrors must not have any overlap with its neighbor to prevent optical fringing or etalons. However, this is a more stringent requirement than its actually required. To prevent fringing, it is required that only the inlet and outlet beams have no overlaps with its neighbors. We introduce this new concept to our multipass cell design and achieve drastically reduced volume for a given optical path length. For example, for FIG. 21, the constraint on the optical design now only requires no overlap for the inlet mirror 2101. Our current prototype utilizes this concept and this is the reason behind the tapered cell design as seen in FIGS. 18 and 19A-C.

Figure 23:
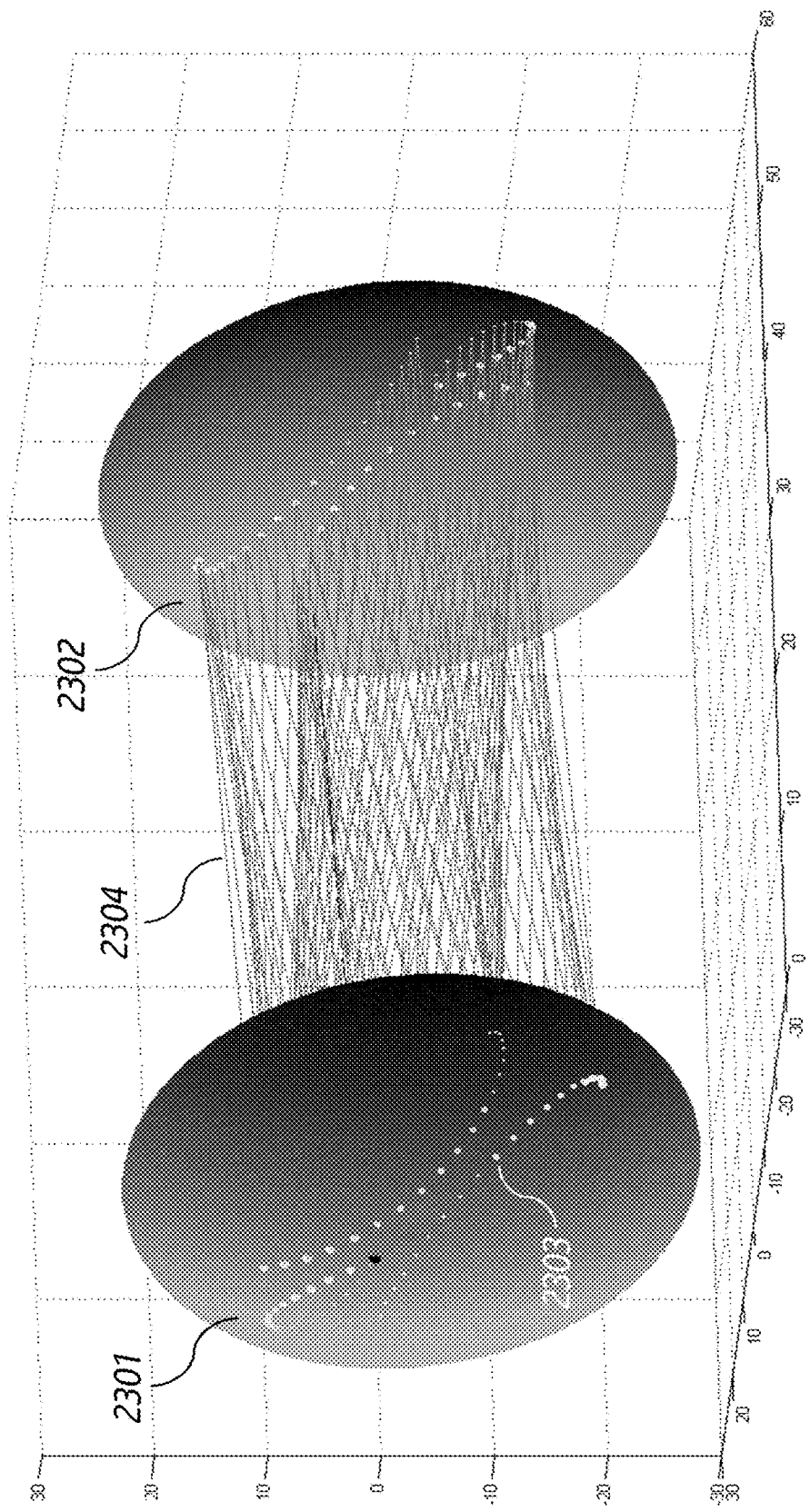
FIG. 23: An example non-elliptical beam pattern.

This idea was expanded to achieve even lower volumes by utilizing an elliptical beam pattern as shown in FIG. 22. In this example, the inlet mirror 2201 has two holes 2204 as the inlet and outlet (interchangeable). The surface on 2201 is spherical but the outline of the mirror can be made rectangular or any other shape, as long as it does not block the beam pattern. Please note that in this embodiment, the beams are completely overlapping on the returning mirror 2202. Not only that, but the beam reflection spots in the regions denoted by 2203 and 2205 are overlapping as well. This allows for significantly increased optical path length within a small volume as shown by the envelope of the lines shown by the laser paths. In addition, in the vehicle exhaust application where insertion of a probe into a flow can increase the backpressure and adversely impact the operation, this design allows for drastically low blockage of cross-sectional area when the flow impinges on the narrower face. Please note that this concept can be also used for any other non-elliptical beam patterns such as the one shown in FIG. 23. In this figure, the mirrors are shown by 2301 and 2302, the spot pattern is shown by 2303 and the ray trace is shown by 2304.

The invention claimed is:

1. A laser absorption spectroscopy exhaust gas sensor designed to operate at temperatures above a temperature of 300° C., comprising:
    an optical cell with porous walls having pores with a mean diameter in the range of 10 nm to 10 microns;
    gold mirrors within the optical cell positioned to support a multi-pass optical path within the optical cell, wherein the multi-pass optical path between the gold mirrors is entirely within free space, wherein each of the gold mirrors is composed of a gold coating deposited on a substrate;
    wherein the materials of the porous walls, the gold coating, and the substrate are selected to operate at a temperature above 300° C.;
    an active heating element adapted to heat the optical cell to prevent condensation;
    a laser adapted to generate a laser beam;
    an optical detector adapted to detect a returning laser beam; and
    a processor that is isolated from the optical cell by a flexible conduit for controlling the laser and the active heating element and for analyzing signals from the optical detector to identify a gas in the optical cell.

2. The laser absorption spectroscopy exhaust gas sensor of claim 1 further comprising an optical waveguide adapted to carry the laser beam from the laser to the optical cell and to carry the returning laser beam from the optical cell to the detector, and adapted to thermally isolate the laser from the optical cell.

3. The laser absorption spectroscopy exhaust gas sensor of claim 1 wherein the porous walls are composed of porous sintered metal powder, wire mesh, or ceramic.

4. The laser absorption spectroscopy exhaust gas sensor of claim 1 wherein the porous walls have pores with a mean diameter sufficiently large to allow a desired gas for sensing to pass through the pores and sufficiently small to block undesired contaminate particles from passing through the pores.

5. The laser absorption spectroscopy exhaust gas sensor of claim 1 wherein the substrate is fused silica.

6. The laser absorption spectroscopy exhaust gas sensor of claim 1 wherein the active heating element is integrated within the porous walls.

7. The laser absorption spectroscopy exhaust gas sensor of claim 1 wherein the active heating element is attached to the porous walls.

8. The laser absorption spectroscopy exhaust gas sensor of claim 1 wherein the active heating element is adapted to heat the optical cell to a temperature above a saturation temperature of components in an exhaust gas in order to prevent condensation.

9. The laser absorption spectroscopy exhaust gas sensor of claim 1 wherein the walls of the optical cell have non-porous sections.

10. The laser absorption spectroscopy exhaust gas sensor of claim 1 wherein the gold mirrors comprise concave mirrors.

11. The laser absorption spectroscopy exhaust gas sensor of claim 1 wherein the gold mirrors comprise opposing spherical mirrors whose focal lengths differ.

12. The laser absorption spectroscopy exhaust gas sensor of claim 1 wherein the porous walls have multiple sections with differing wall thicknesses adapted to enhance a flow of gas into the optical cell.

13. The laser absorption spectroscopy exhaust gas sensor of claim 1 wherein the multi-pass optical path has a length greater than 50 cm with physical length less than 5 cm.

14. The laser absorption spectroscopy exhaust gas sensor of claim 1 wherein the multi-pass optical path has a partially overlapped beam spot pattern on mirrors with an elliptical shape on mirrors away from the inlet and outlet holes.

15. The laser absorption spectroscopy exhaust gas sensor of claim 1 further comprising a fastening thread positioned around the optical cell and adapted to secure the laser absorption spectroscopy exhaust gas sensor to a vehicle exhaust pipe.

16. The laser absorption spectroscopy exhaust gas sensor of claim 1 further comprising an adhesion layer sandwiched between the gold coating and the substrate.

17. The laser absorption spectroscopy exhaust gas sensor of claim 16 wherein the adhesion layer comprises Ti or Ni.

18. The laser absorption spectroscopy exhaust gas sensor of claim 1 wherein the substrate has a thermal expansion coefficient that substantially matches that of gold.

19. A laser absorption spectroscopy exhaust gas sensor comprising:
an optical cell;
mirrors within the optical cell positioned to support a multi-pass optical path within the optical cell, wherein the multi-pass optical path reflects from the mirrors at beam spots on the mirrors, where some of the beam spots away from the inlet and outlet overlap significantly with each other;
a laser adapted to generate a laser beam;
an optical detector adapted to detect a returning laser beam; and
a processor for controlling the laser and for analyzing signals from the optical detector to identify a gas in the optical cell.

20. The laser absorption spectroscopy exhaust gas sensor of claim 19 wherein the beam spots on the mirrors form a pattern that has an elliptical shape.

21. The laser absorption spectroscopy exhaust gas sensor of claim 19, wherein the mirrors comprise opposing spherical mirrors whose focal lengths differ.

* * * * *